US012498000B2

(12) United States Patent
Schmitz

(10) Patent No.: US 12,498,000 B2
(45) Date of Patent: Dec. 16, 2025

(54) CONSTANT VELOCITY JOINT

(71) Applicant: AKTIEBOLAGET SKF, Gothenburg (SE)

(72) Inventor: Tom Schmitz, Hambach (DE)

(73) Assignee: AKTIEBOLAGET SKF, Gothenburg (SE)

( * ) Notice: Subject to any disclaimer, the term of this patent is extended or adjusted under 35 U.S.C. 154(b) by 378 days.

(21) Appl. No.: 18/123,469

(22) Filed: Mar. 20, 2023

(65) Prior Publication Data

US 2023/0323921 A1 Oct. 12, 2023

(30) Foreign Application Priority Data

Apr. 7, 2022 (DE) .......................... 102022203464.3

(51) Int. Cl.
*F16D 3/224* (2011.01)
*F16D 3/223* (2011.01)
*F16D 3/2233* (2011.01)

(52) U.S. Cl.
CPC .............. *F16D 3/224* (2013.01); *F16D 3/223* (2013.01); *F16D 2003/22309* (2013.01); *F16D 3/2233* (2013.01); *Y10S 464/906* (2013.01)

(58) Field of Classification Search
CPC ........ F16D 3/224; F16D 3/223; F16D 3/2233; F16D 2003/22309; Y10S 464/906
USPC ......................................................... 464/144
See application file for complete search history.

(56) References Cited

U.S. PATENT DOCUMENTS

| 5,186,687 | A  | * | 2/1993 | Hayashi | ................... F16D 3/229 |
| | | | | | 464/144 |
| 6,227,979 | B1 | * | 5/2001 | Yamamoto | ............ F16D 3/2245 |
| | | | | | 464/144 |
| 8,382,600 | B2 | * | 2/2013 | Oh | .......................... F16D 3/223 |
| | | | | | 464/144 |

* cited by examiner

*Primary Examiner* — Greg Binda
(74) *Attorney, Agent, or Firm* — J-TEK LAW PLLC; Scott T. Wakeman; Mark A. Ussai

(57) ABSTRACT

A constant velocity joint includes an outer part having an opening and a plurality of axially extending race grooves in the opening, an inner part at least partially located in the opening and having an outer surface with a plurality of axially extending race grooves, and a plurality of balls located between in inner and outer parts in the grooves. A first subset of the race grooves in the outer part and/or a first subset the race grooves in the inner part includes a section that follows a curved path in the axial direction.

7 Claims, 3 Drawing Sheets

CONSTANT VELOCITY JOINT

CROSS-REFERENCE

This application claims priority to German patent application no. 10 2022 203 464.3 filed on Apr. 7, 2022, the contents of which are fully incorporated herein by reference.

TECHNOLOGICAL FIELD

The present disclosure is directed to a constant velocity joint that is capable of operating efficiently at a variety of different working angles.

BACKGROUND

Constant velocity joints, sometimes referred to as homokinetic joints, are used in order to enable a transmission of force or torque from one shaft to another. The first shaft and the second shaft can also be attached to each other at an angle. Such constant velocity joints include a joint outer part and a joint inner part and balls for transmitting torque disposed therebetween. The joint outer part has internal, axially extending race grooves that face external, axially extending race grooves of the joint inner part so that the balls are each guided in a raceway that is respectively formed from a pair of outer and inner race grooves. For the guiding of the balls A cage disposed between the joint outer part and the joint inner part is additionally used to guide the balls.

In known constant velocity joints the axial race grooves extend linearly with the race grooves being either parallel to the axis of rotation, i.e., straight, or tilted with respect to the axis of rotation, i.e., obliquely.

With a working angle of 0°, i.e., an axial alignment of the two shafts with respect to each other, a very high torque, maximum for the respective constant velocity joint, can be transmitted. Constant velocity joints in this configuration simultaneously show a high efficiency. However, if the two shafts are deflected toward each other, i.e., if they operate with a working angle greater than 0°, the efficiency is reduced by resulting friction and heat.

This efficiency can be increased by using raceways that extend obliquely, that is, raceways whose start and end are offset in the circumferential direction, with a large working angle. However, with such raceways the force is increased between a cage used and the balls so that damage and possible failure of the cage can occur even at lower torques compared to raceways that are do not have ends that are offset in the circumferential direction.

SUMMARY

An aspect of the present disclosure is therefore to provide a constant velocity joint that is capable of providing a high efficiency of the constant velocity joint even with large working angles, while simultaneously transmitting a high torque with small working angle.

The disclosed constant velocity joint includes a joint inner part and a joint outer part that has a connecting side and an opening side. The joint outer part includes a plurality of axially extending race grooves, and the joint inner part also includes a plurality of axially extending race grooves, pairs of the race grooves of the joint outer part and the joint inner part forming a raceway for a ball.

The balls transmit force and torque between the joint outer part and the joint inner part. In this way the torque of a shaft that is connected to the joint outer part can be transmitted to a shaft that is connected to the joint inner part, or vice-versa. Due to the axially extending ball raceways, the two joint parts can additionally be tilted relative to each other. With rotating shafts, such a tilting leads to a movement of the balls in the ball raceways.

In comparison to previous constant velocity joints, in order for the constant velocity joint to both transmit a high torque and maintain a high efficiency, even for large working angles, i.e., a significant tilting of the two joint parts with respect to each other, the axially extending race grooves of at least one raceway include at least one first section that has a curved course in the axial direction. In contrast to known constant velocity joints, the race grooves of a raceway thus do not extend completely linearly in the axial direction but rather have in the axial course an at least partially an arc-shaped deviation from the axial linear course. Such an at least sectional curvature has proved to be advantageous with respect to the working angle as well as the efficiency. This means that such a curved raceway allows for a high efficiency with a high working angle. When a cage is used, the force that is exerted on the cage is additionally reduced in comparison to raceways with a purely linear, oblique course, whereby the service life of the cage is extended, and the maximum transmissible torque is increased.

According to one embodiment, the race grooves of at least one raceway include at least one second section that has a curved course in the axial direction, wherein a curvature change is provided between the first and the second section. This means that in the first section the race grooves of a raceway describe an arc in one circumferential direction and in the second section describe an arc in the other (opposite) circumferential direction. The raceway can also include a plurality of first and second sections that preferably alternate. The angle of curvature of the two sections can be identical or differ from each other. Such a design with at least one first and one second section with an angle of curvature has the advantage that when the ball is located where the curvature changes and where the working angle is 0°, a high torque can be transmitted between the two joint parts, while at the same time in the case of a large working angle, i.e., a large deflection of the two joint parts with respect to each other, a high efficiency in the two curvature sections can be maintained. In particular, with a working angle of 0° in the constant velocity joint disclosed here, a torque can be transmitted that corresponds to the maximum transmissible torque of a constant velocity joint with axially straight and linearly extending raceways.

According to a further embodiment, the race grooves of at least one raceway include at least one third section that extends linearly and in particular straight. Alternatively the third, linearly extending section can also extend obliquely. In one embodiment the third section can be disposed before or after the first and/or the second section. This means that the third section can connect to the first and/or second curved sections and thus can be disposed on one or both axial end regions of the raceway. The third section can preferably be disposed between the first and the second section. In this case the third section can extend in particular straight. In this way the range in which a high torque is transmitted is extended onto a linear section instead of only onto a small region of the change between the first and the second curvature section.

According to a further embodiment, the curvature change between the first and the second section, and/or the third section, is disposed in an angular range of a working angle of 0°, in particular in a range of +/−5° about the working angle of 0°, i.e., the active region of the raceway. As already explained above, in this way the range of the transmission of a high torque can be increased. Furthermore, in the region of the linearly and straight-extending third section, less force is exerted on a cage in comparison to the previously known linear, axially obliquely extending raceways, which in turn reduces the attrition and wear of a cage used.

According to a further embodiment, a constant velocity joint includes a joint outer part having a connecting side configured to connect to a first shaft and an opening side having an opening and a plurality of axially extending race grooves in the opening, a joint inner part at least partially located in the opening, the joint inner part including an outer surface having a plurality of axially extending race grooves, and a plurality of balls between the joint inner part and the joint outer part, each of the plurality of balls being located partly in one of the plurality of race grooves of the joint outer part and partly in one of the plurality of race grooves of the joint inner part. A first subset of the plurality of race grooves of the joint outer part and/or a first subset the plurality of race grooves of the joint inner part includes a first section that follows a first curved path in the axial direction and second section that follows a second curved path in the axial direction and a third section that is linear. A second subset of the race grooves may be linear, that is, may have no curved sections.

According to a further embodiment, a greatest difference between a tangent of the first curved path and a tangent of the second curved path is less than or equal to 10° and/or a greatest difference between the tangent of the first curved path an edge of the linear third path is +/−5°.

According to a further embodiment, the axial courses of two adjacent raceways are mirror-inverted with respect to each other. This means that two circumferentially adjacent raceways converge in the axial direction and diverge again, or vice versa.

According to a further embodiment, at least one of the raceways may not have a curvature, but can instead extend linearly, not displaced in the circumferential direction, i.e., straight. In this way, pairs of raceways that each extend mirror-inverted can be formed, and the total number of raceways, when necessary, can be supplemented by a further, axially linearly extending raceway in order to be able to distribute the raceways uniformly on the circumference of the constant velocity joint.

It should be noted that the raceways of the constant velocity joint can include different combinations of first, second, and/or third sections. All raceways preferably include a curved first and/or second section, as well as a third, straight-extending section. However, other arrangements are also possible.

Furthermore, groups of raceways can be formed from curved and uncurved raceways. For example, with nine raceways the following pattern can be formed: first course, second course, mirror-inverted with respect to the first course, straight course, first course, second course, straight course, first course, second course, straight course. Any other combination of curved and uncurved courses is also possible.

Further advantages and advantageous embodiments are specified in the description, the drawings, and the claims. Here in particular the combinations of features specified in the description and in the drawings are purely exemplary, so that the features can also be present individually or combined in other ways.

In the following the invention is described in more detail using the exemplary embodiments depicted in the drawings. Here the exemplary embodiments and the combinations shown in the exemplary embodiments are purely exemplary and are not intended to define the scope of the invention. This scope is defined solely by the pending claims.

DETAILED DESCRIPTION

In the following, identical or functionally equivalent elements are designated by the same reference numbers.

Figure 1:
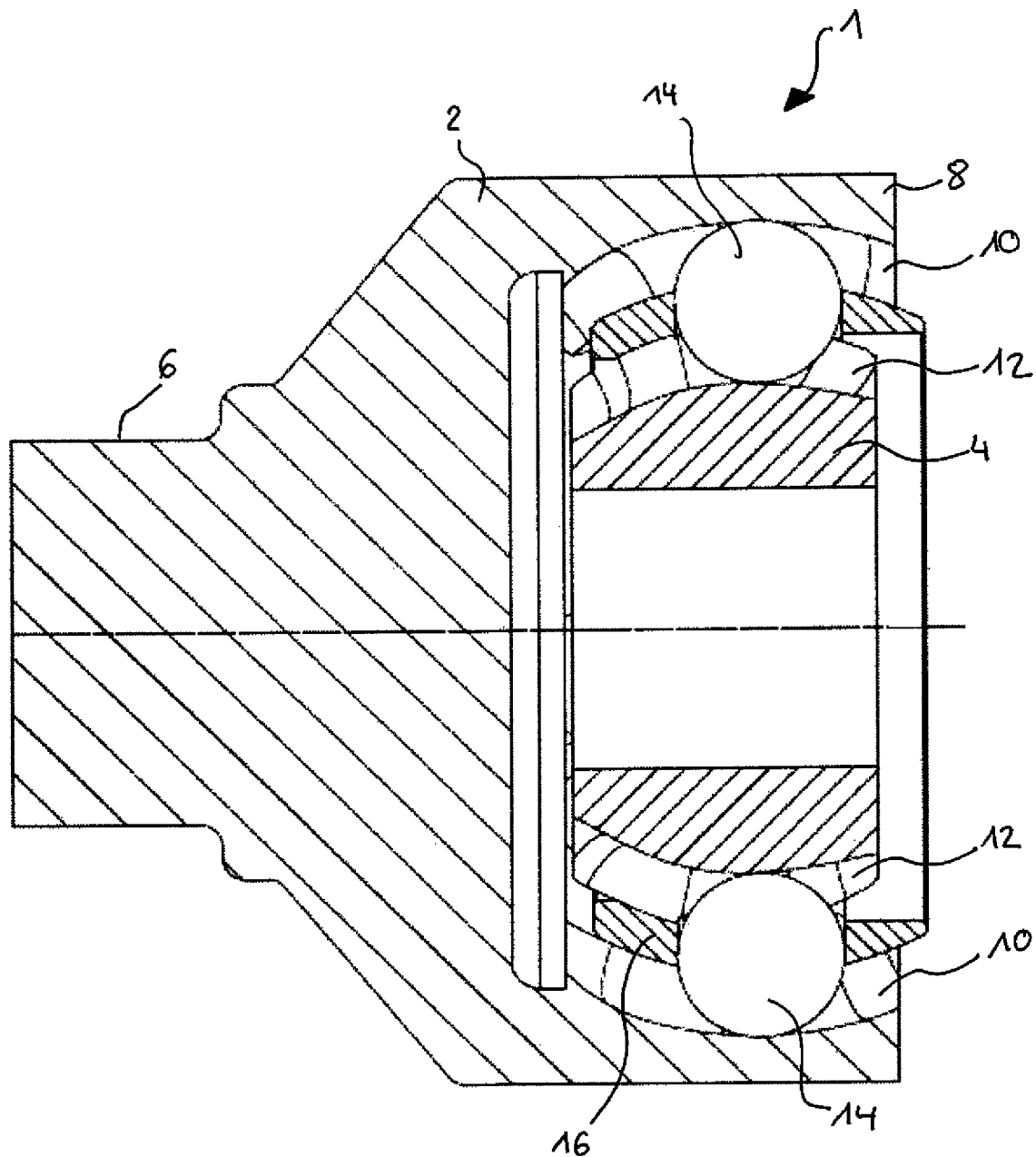
FIG. 1 is a sectional view of a constant velocity joint according to an embodiment of the present disclosure.

FIG. 1 shows a constant velocity joint 1 including a joint outer part 2 and a joint inner part 4. The joint outer part 2 can be connected by a connecting side 6 to a first shaft (not shown). An opening in a side 8 of the joint outer part 2 receives the joint inner part 4. The joint inner part 4 can be connected to a second shaft (not shown).

Figure 2:
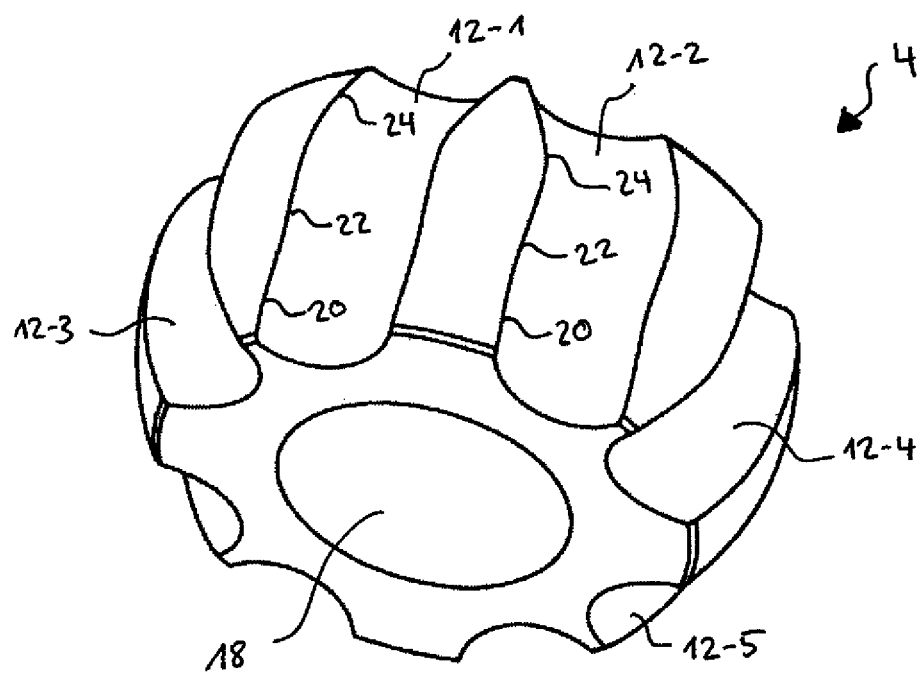
FIG. 2 is a perspective view of a joint inner part of the constant velocity joint of FIG. 1.

The joint outer part 2 includes a plurality of axially extending grooves 10, and the joint inner part 4 also includes a plurality of axially extending grooves 12. As shown in FIG. 2, the joint inner part 4 can be viewed as a star-shaped ring that has a plurality of axially extending grooves 12 and a central bore 18.

In order to transmit force and torque between the joint outer part 2 and the joint inner part 4, balls 14 are provided that are guided by a cage 16. Each outer race groove 10 and inner race groove 12 form a raceway, and a ball 14 is disposed in each of the raceways. The axially extending grooves 10, 12, allow the two joint parts 2, 4 to be tilted relative to each other. With rotating shafts, such a tilting leads to a movement of the balls 14 in the raceways.

The joint inner part 4 and the joint outer part 2 are described in more detail hereinafter with reference to FIGS. 2 to 5.

In order for the constant velocity joint to both transmit a high torque and achieve a high efficiency for large working angles, i.e., a large tilting of the two joint parts 2, 4 with respect to each other, the axially extending race grooves 10, 12 of a raceway have, at least sectionally, a curvature in the axial course. The race grooves 10, 12 of a raceway therefore do not extend linearly in the axial direction, but rather have, in the axial course, an arc-shaped deviation from the axial linear course. At the same time, due to the arc-shaped design of the race grooves 10, 12 of a raceway, the efficiency is increased with large working angles. In comparison to raceways with linear course displaced in the circumferential direction, the force that is exerted on the cage 16 is reduced, whereby the service life of the cage 16 is extended.

As is shown in FIGS. 2 to 5, the race grooves 10, 12 can in particular have two curvature changes with a linear section between the two curvature changes. Preferably the ends of the linear section are not offset in the circumferential direction.

Figure 3:
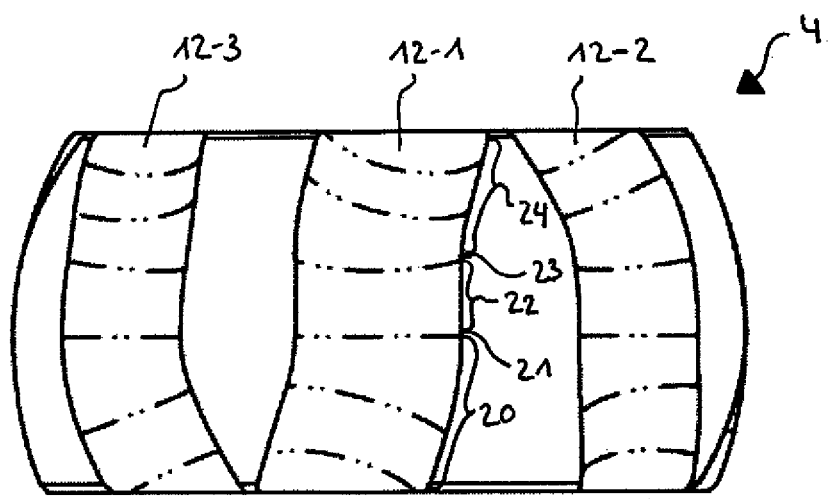
FIG. 3 is a plan view of the joint inner part of FIG. 2.
Figure 4:
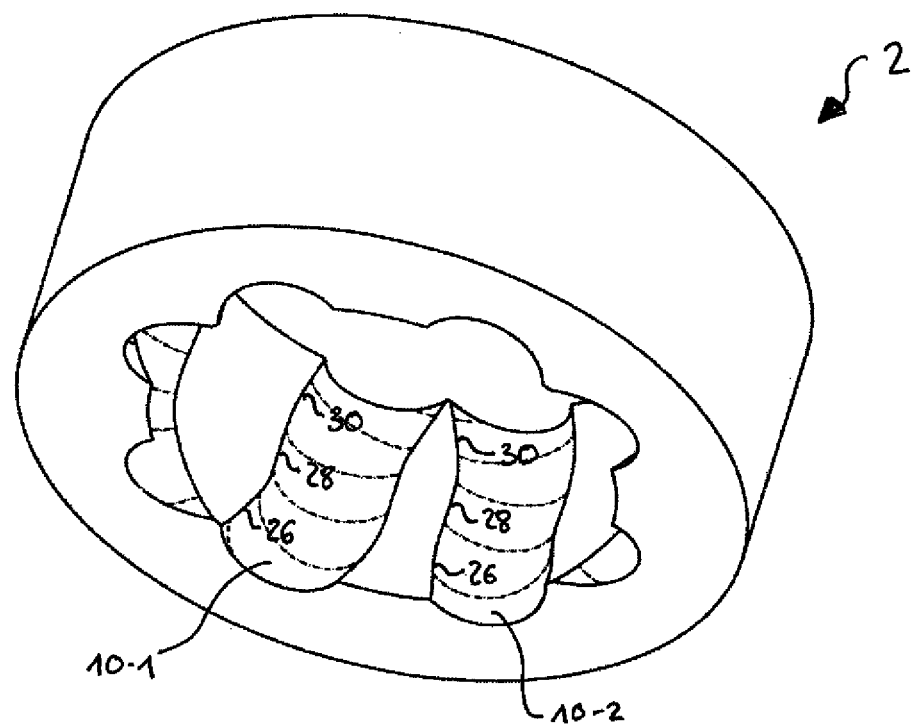
FIG. 4 is a perspective view of a part of the joint outer part of the constant velocity joint of FIG. 1.
Figure 5:
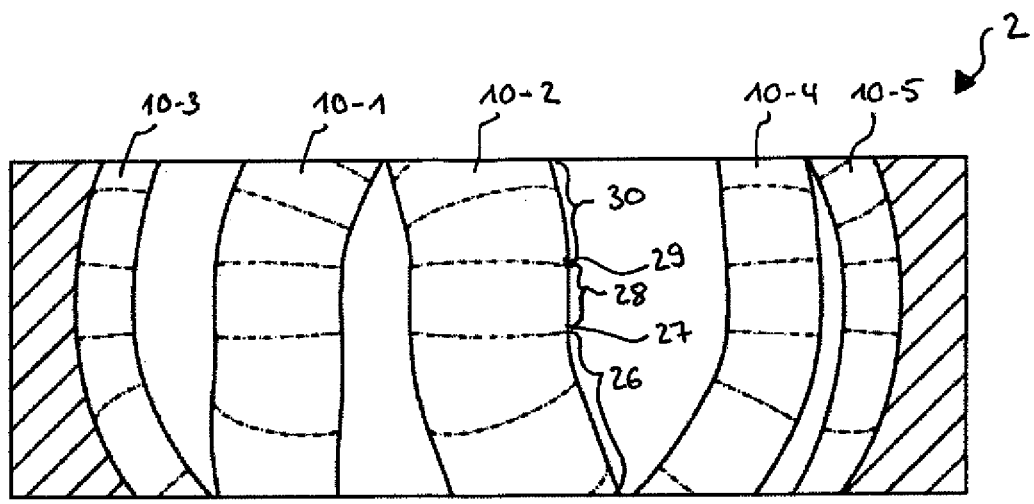
FIG. 5 is a plan view of the joint outer part of FIG. 4.

The race groove 12-1 of the joint inner part 4 will now be described, but this description also applies to the remaining race grooves of the joint inner part 4. As is shown in FIGS. 2 and 3, the race groove 12-1 includes a first section 20 that is curved. After a curvature change 21, a second section 22 connects to this first section 20; the second section 22 extends axially and linearly and the ends of the second section are not offset in the circumferential direction. After a curvature change 23, a third section 24 connects thereto which is also curved. For this purpose the race groove 10-1 of the joint outer part 2 (see FIGS. 4 and 5) includes sections 26 to 30 complementary to the aforementioned sections of the joint inner part 4. The two sections 26 and 30 are curved and include an axial linear section 28 the ends of which are not offset in the circumferential direction between the curvature changes 27 and 29. Such a design has the advantage that when the ball is located in the axial linear section 22, 28, a high torque can be transmitted between the two joint parts 2, 4. Due to the curved sections 20, 24, 26, 30, 8, a high efficiency can be achieved simultaneously with large working angles.

Two adjacent raceways with their race grooves (e.g., 12-1 and 12-2, as well as 10-1 and 10-2) are preferably mirror-inverted with respect to each other. Here the respective circumferential race grooves 12-1, 12-2 and 10-1, 10-2 each converge at one end and diverge at the other.

A curvature change 21 between the first section 20 and the second section 22, and/or a curvature change 23 between the second section 22 and the third section 24, is disposed in an angular range of a working angle of 0°, in particular in a range of +/−5° about the working angle of 0°, i.e., the active region of the raceway. As already explained above, in this way the range of the transmission of a high torque can be increased. Furthermore, in the region of the linearly and straight-extending second section 22, less force is exerted on a cage in comparison to the previously known linear, axially obliquely extending raceways, which in turn reduces the attrition and wear of a cage used.

According to a further embodiment, a greatest difference between a tangent of a first curved path (e.g., the first section 20) and a tangent of a second curved path (e.g. the third section 24) is less than or equal to 10° and/or a greatest difference between the tangent of the first curved path (the first section 20) an edge of a linear path (e.g., the second section 22) is +/−5°.

In summary, due to the constant velocity joint described here, a high efficiency is achieved with a large working angle, wherein a high torque can be transmitted simultaneously with small working angles, which is comparable to the transmissible torque of a usual constant velocity joint with axially linearly extending raceways.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved constant velocity joints.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Constant velocity joint
2 Joint outer part
4 Joint inner part
6 Connecting side
8 Opening side
10 Outer race grooves
12 Inner race grooves
14 Ball
16 Cage
18 Bore
20 Curvature section
21 Curvature change
22 Linear section
23 Curvature change
24 Curvature section
26 Curvature section
27 Curvature change
28 Linear section
29 Curvature change
30 Curvature section

What is claimed is:

1. A constant velocity joint, comprising:
a joint outer part having a connecting side configured to connect to a first shaft and an opening side having an opening and a plurality of axially extending race grooves in the opening;
a joint inner part at least partially located in the opening, the joint inner part including an outer surface having a plurality of axially extending race grooves; and
a plurality of balls between the joint inner part and the joint outer part, each of the plurality of balls being located partly in one of the plurality of race grooves of the joint outer part and partly in one of the plurality of race grooves of the joint inner part,
wherein a first subset of the plurality of race grooves of the joint outer part and a first subset the plurality of race grooves of the joint inner part includes a first section that follows a first curved path in the axial direction,
wherein the first subset of the plurality of race grooves of the joint outer part and the first subset of the plurality of raceways of the joint inner part include a second section that follows a second curved path in the axial direction,
wherein the first curved path has a first curvature and the second curved path has a second curvature opposite the first curvature, and
wherein the first subset of the plurality of race grooves of the joint outer part and the first subset of the plurality of race grooves of the joint inner part include a linear third section.

2. The constant velocity joint according to claim 1, wherein the third section is located between the first section and the second section.

3. The constant velocity joint according to claim 1, wherein a curvature change from the first section to the second section is +/−5° about a working angle of 0°.

4. The constant velocity joint according to claim 1, wherein a greatest difference between a tangent of the first curved path and a tangent of the second curved path is less than or equal to 10°.

5. The constant velocity joint according to claim 4, wherein a greatest difference between the tangent of the first curved path and an edge of the linear third section is +/−5°.

6. The constant velocity joint according to claim 1, wherein the first path is mirror inverted relative to the second path.

7. The constant velocity joint according to claim 1, wherein the first curvature is complementary to the second curvature.

* * * * *